G. W. Middlecoff,
Horse Rake.
No. 89,160.  Patented April 20, 1869.
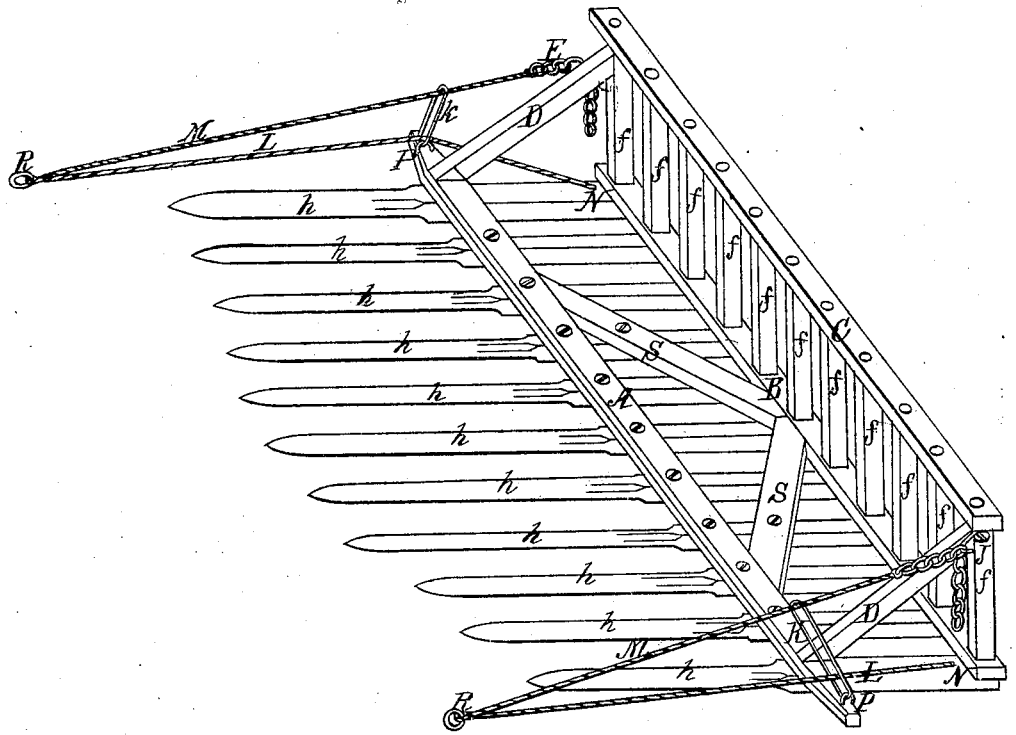
WITNESSES.
Daniel B. Reaves,
W. E. Dicks.
INVENTORS.
G. W. Middlecoff
By his attorney
G. L. Chapin

United States Patent Office.

G. W. MIDDLECOFF, OF ATLANTA, ILLINOIS, ASSIGNOR TO HIMSELF AND A. McR. BLAIN, OF SAME PLACE.

Letters Patent No. 89,160, dated April 20, 1869.

IMPROVEMENT IN HORSE-RAKES.

The Schedule referred to in these Letters Patent and making part of the same.

*To all whom it may concern:*

Be it known that I, G. W. MIDDLECOFF, of Atlanta, in the county of Logan, and State of Illinois, have invented a new and useful Improvement in "Hay-Gatherers;" and I do hereby declare that the following is a full, clear, and exact description thereof, which will enable others skilled in the art to make and use the same, reference being had to the accompanying drawing and letters marked thereon, making a part of this description, in which—

Figure 1 is a perspective representation of my invention.

The present invention relates to an improvement in that class of farm implements which are used more especially for taking hay from windrows and cocks and drawing it to a stack, or other place, where it is to be stored, and its nature will be fully understood by the following detailed description.

$h$ $h$, &c., represent the teeth of an ordinary hay-rake, which are securely bolted or fastened to the under side of cross-pieces A B.

At the head of the rake is a series of standards, $f$ $f$, tenoned into the cross-piece B, and also into a cap, C, the end standards $f$ being securely braced by means of pieces of small scantling, D, the lower ends of which are permanently fixed to the cross-piece A, hold the cap C rigidly in place, as it is against any draught of hay; and the braces S being secured to the teeth $h$ $h$ and the cross-pieces A B, so strengthen the rake as to prevent the teeth from turning on the bolts with which they are held in place.

The devices for operating the rake consist of ropes L, fastened to the end teeth at N N, pass through metal loops K, and terminate in loops R; and ropes M, which are fastened to loops R, pass back through the loops K and are fastened to chains E, said chains being fastened to the end standards $f$ by means of hooks J.

The object of this arrangement is properly to adjust the pitch of the teeth $h$ $h$, &c., to the surface that they are being drawn over, and also to provide means for drawing the rake from under a draught of hay without straining the standards and loosening the braces D.

The dotted lines $x$ represent the position of one of the ropes, when the rake is moved backward; and from this, it will be seen that the ropes M exert their force in the same manner upon the braces D, as they do when the rake is moved forward, the loops K being the first points of resistance, and transferring the draught points to the ends of the cross-piece A, instead of the points N J, on the teeth and standards $f$, as when the rake is moved forward.

The loops K perform the additional function of holding the ropes M L in position relative to each other, and preventing hay from so disarranging them as to change the line of draught.

The operation is very simple, requiring only that a horse be hitched to each of the loops R, and the rake or gatherer be moved forward until a load of hay has been accumulated, after which it is drawn, with its load, to a stack, or place where the hay is to be stored.

During the act of filling the gatherer with hay, it is quite necessary to have the teeth $h$ run close to the ground, but after it is loaded this is not the case, and to so change the line of draught as to prevent the teeth from catching, the chains E should be let out one or more links on the hooks J, as the case may require.

This adjustment may be also necessary when gathering hay on inclined places.

Having thus described my invention,

What I claim, and desire to secure by Letters Patent of the United States, is—

A hay-gatherer, consisting of the teeth $h$, cross-pieces A B, braces S D, standards $f$, and cap C, in combination with ropes M L, chains E, and loops K, as set forth.

G. W. MIDDLECOFF.

Witnesses:
  A. McR. BLAIN,
  BENJ. BEAN.